(12) United States Patent
Nagasaka et al.

(10) Patent No.: US 7,139,139 B2
(45) Date of Patent: Nov. 21, 2006

(54) OPTICAL MODULE

(75) Inventors: Shigeki Nagasaka, Osaka (JP); Kenichi Nakama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/359,108

(22) Filed: Feb. 5, 2003

(65) Prior Publication Data

US 2003/0147649 A1   Aug. 7, 2003

(30) Foreign Application Priority Data

Feb. 6, 2002   (JP)   ............... 2002-029920

(51) Int. Cl.
  G02B 27/00   (2006.01)
  G02B 5/00    (2006.01)
  G02B 7/00    (2006.01)
(52) U.S. Cl. ........................ 359/894; 385/24
(58) Field of Classification Search .......... 359/894, 359/895; 385/24
See application file for complete search history.

(56) References Cited

U.S. PATENT DOCUMENTS

| | | | |
|---|---|---|---|
| 4,229,709 A | 10/1980 | McMahan | 331/94.5 T |
| 4,755,031 A | 7/1988 | Daviau et al. | 350/588 |
| 5,425,045 A | 6/1995 | Hamatani | 372/101 |
| 6,014,263 A | 1/2000 | Schaeffer et al. | 359/642 |
| 6,026,109 A * | 2/2000 | Micke et al. | 372/92 |
| 6,493,960 B1 * | 12/2002 | Taylor et al. | 34/80 |
| 6,731,838 B1 * | 5/2004 | Dueck et al. | 385/37 |
| 2002/0170437 A1 * | 11/2002 | DeGuiseppi et al. | 96/134 |
| 2004/0136664 A1 * | 7/2004 | Kadar-Kallen et al. | 385/94 |

FOREIGN PATENT DOCUMENTS

| | | |
|---|---|---|
| GB | 1 527 621 | 10/1978 |
| JP | 59-12133 | 7/1984 |
| JP | 59-121311 | 7/1984 |
| JP | 60-244917 | 12/1985 |
| JP | 61-252504 | 11/1986 |
| JP | 62287217 | * 12/1987 |
| JP | 5-49846 | 3/1993 |
| JP | 5-333208 | 12/1993 |
| JP | 06-230241 | 8/1994 |
| JP | 07-020361 | 1/1995 |
| JP | 07-080235 | 3/1995 |
| JP | 7198990 | * 8/1995 |
| JP | 9-36145 | 2/1997 |
| JP | 9-36691 | 2/1997 |
| JP | 09-243855 | 9/1997 |
| JP | 10-143460 | 5/1998 |
| JP | 11-68245 | 3/1999 |
| JP | 2000-284141 | 10/2000 |
| JP | 2001-324653 | 11/2001 |
| JP | 2003-133461 | 5/2003 |
| SU | 1820354 A1 | 6/1993 |

* cited by examiner

*Primary Examiner*—Leonidas Boutsikaris
(74) *Attorney, Agent, or Firm*—Fish & Richardson P.C.

(57) ABSTRACT

An optical module includes a package, which accommodates an optical system. A package main body has an opening. A lid is attached to the main body to close the opening of the main body. The lid seals the package. An anti-deterioration agent for preventing deterioration of the optical system is located inside the package at a position out of a light path of the optical system. The anti-deterioration agent includes at least one of desiccant and deoxidant.

6 Claims, 3 Drawing Sheets

(a)

(b)

OPTICAL MODULE

CROSS REFERENCE TO RELATED APPLICATIONS

Pursuant to 35 USC § 119, this application claims the benefit of Japan Patent Application No. 2002-029920 filed Feb. 6, 2002.

BACKGROUND OF THE INVENTION

The present invention relates to an optical module that accommodates an optical system inside a package. For example, the present invention pertains to an optical module, such as a demultiplexer for a wavelength division multiplexing transmission system.

A wavelength division multiplexing transmission technology is a system for multiplexing multichannel optical transmission signals into one optical fiber and is suitable for a high-capacity long-distance transmission system. The optical transmission signal of each channel is, for example, a light beam having different wavelength at a predetermined interval (for example, 0.4 nm) within 1550 nm band. That is, light beams (wavelength $\lambda 1$ to $\lambda n$) having different wavelengths, the number of which is n, are used for the optical transmission signals of channels (ch), the number of which is n, that are multiplexed into one optical fiber are.

The wavelength division multiplexing transmission requires light sources for several channels, a multiplexer for combining light signals of several channels into one optical fiber, an optical fiber amplifier, and a demultiplexer for separating the light signals of several channels into each wavelength.

A typical demultiplexer 10 is shown in FIG. 5. The demultiplexer 10 includes a package 11, which accommodates an optical system. The optical system includes a collimator lens 12 and a diffraction grating 13. Optical signals having different wavelengths are multiplexed and transmitted to the package 11 as incident light. The collimator lens 12 converts the incident light into parallel light. The diffraction grating 13 separates the parallel light into each wavelength. A fiber chip 15 for retaining an input optical fiber 14 and a photodetector array 16, which has photodetectors, are secured to the outer surface of the package 11. Output terminals 17 are each connected to one of the photodetectors of the photodetector array 16. A polarized wave compensating filter 18 is accommodated inside the package 11. The polarized wave compensating filter 18 compensates for the direction of travel of each light beam (polarized light) separated into each wavelength by the diffraction grating 13 and returns the light into unpolarized light.

In a module that has an optical system inside the package 11 as the demultiplexer 10, dew formation on the surface of each optical device and deterioration of each optical device must be prevented. For example, if any moisture is included inside the package 11, the moisture forms dew on the surface of the optical device at low temperature, and deteriorates the optical characteristic. Thus, the inside of the package 11 needs to be dried. To prevent due formation during usage or storing under low temperature, the amount of moisture inside the package 11 needs to be less than the moisture calculated from the saturated vapor pressure under that temperature. As shown in FIG. 6, the diffraction grating 13 consists of a retainer 19; a resin molded layer 20, which is formed on the surface of the retainer 19; and an aluminum layer 21, which is formed on the resin molded layer 20 to increase reflection coefficient. If the aluminum layer 21 deteriorates by oxidization, the reflection coefficient of the aluminum layer 21 decreases. Thus, oxidization of the aluminum layer 21 must be prevented.

An inner surface 22 of the package 11 is a surface through which incident light from an input optical fiber 14 passes and also a surface through which light beams separated by the diffraction grating 13 passes toward each photodetector of the photodetector array 16. Therefore, an antireflection dielectric multilayer film is formed on the inner surface 22. Thus, deterioration of the dielectric multilayer film needs to be prevented. The dielectric multilayer film includes three films each formed of magnesium fluoride, silicon dioxide, or titanium oxide. The single-component films are overlapped on the inner surface 22 in this order from the side close to the inner surface 22. Further, a magnesium fluoride film and a lanthanum titanate film (made of composite material of $TiO_2$ and $La_2O_3$) are overlapped on the surface of the collimator lens 12 in this order from the side close to the collimator lens 12 to prevent reflection.

To prevent dew formation on the surface of each optical device and deterioration of each optical device, the package 11 may be sealed after being filled with dry nitrogen gas or other inert gas, or the package 11 may be sealed after being decompressed. In this method, gas is filled inside the package, exchanged, and sealed during the manufacturing procedure of the module.

However, hermetically sealing the package increases the restrictions on material and structure, which increases the cost. This is because trapping nitrogen gas inside the package or keeping the inside of the package decompressed requires completely sealed package made of material such as ceramics.

Further, to trap nitrogen gas or other inert gas inside the package, a dedicated device and procedure are required and a procedure for trapping nitrogen gas is required. This decreases working efficiency and complicates the manufacturing procedure, which results in the increase of the manufacturing cost. That is, to perform a procedure for trapping the nitrogen gas under the environment filled with nitrogen gas, a tool such as a glove box filled with nitrogen gas is required. Since nitrogen gas is trapped using such tool, the working efficiency is decreased. Also, when replacing air inside the package with nitrogen gas after assembling the module, a structure that permits gas exchange, such as a hose, needs to be provided on the package. In addition, the replacing procedure needs to be performed. This complicates the manufacturing procedure.

Further, to decompress the inside of the package, a device for decompression such as a glove box and a decompression procedure are required. This decreases the working efficiency and complicates the manufacturing procedure, which results in the increase of the manufacturing cost.

SUMMARY OF THE INVENTION

Accordingly, it is an objective of the present invention to provide an optical module that does not require a special device or procedure for preventing dew formation on the surface of each optical device and deterioration by oxidization and that facilitates manufacturing procedure.

To achieve the above objective, the present invention provides an optical module, which includes a package that accommodates an optical system having a light path. The optical module includes a main body, a lid, and an anti-deterioration agent. The main body is part of the package and has an opening. The lid is attached to the main body to close the opening of the main body. The lid seals the package. The anti-deterioration agent is located inside the package at a position out of the light path of the optical system. The anti-deterioration agent is for preventing deterioration of the optical system. The anti-deterioration agent includes at least one of desiccant and deoxidant.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Demultiplexers according to embodiments of the present invention will now be described with reference to drawings. In the description of each embodiment, like or the same numerals are given to those components that are like or the same as the components of the first embodiment and duplicate descriptions are omitted.

Figure 1:
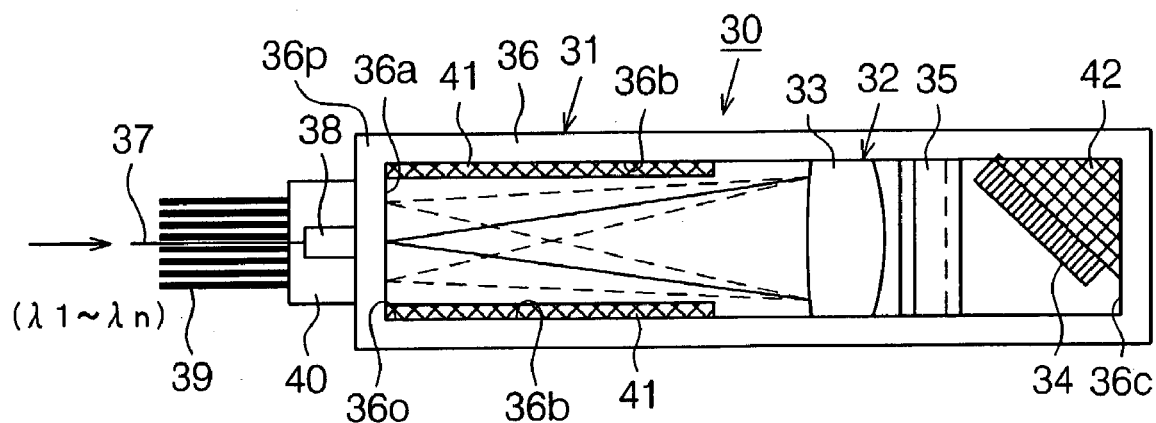
FIG. 1 is a partial cross-sectional view illustrating a schematic structure of a demultiplexer according to a first embodiment of the present invention.

FIG. 1 is a demultiplexer 30 according to a first embodiment. The demultiplexer 30 is used for an optical communication monitoring apparatus of a system that performs the above mentioned wavelength division multiplexing transmission. The demultiplexer 30 has a package 31, which accommodates an optical system 32.

The optical system 32 includes a collimator lens 33 and a demultiplexing unit, which is a diffraction grating 34, inside the package 31. Incident light that is sent to the optical system 32 includes multiplexed optical signals having different wavelengths (wavelength λ1 to λn).

The collimator lens 33 converts the incident light (λ1 to λn) to parallel light. The diffraction grating 34 is inclined with respect to an optical axis of the collimator lens 33 and separates the incident light that is converted to the parallel light into each wavelength by the collimator lens 33. A polarized wave compensating filter 35 is located between the collimator lens 33 and the diffraction grating 34. The polarized wave compensating filter 35 compensates for the direction of travel of each light beam (polarized light) separated by the diffraction grating 34 and returns the light into unpolarized light.

The package 31 includes a main body 36, which has an opening 36o, and a lid 36p, which closes the opening 36o. The lid 36p is adhered to the main body 36 by an adhesive to close the opening 36o, which seals the interior of the main body 36. The main body 36 is made of material such as glass.

The main body 36 has a rectangular solid shape. A fiber chip 38 is secured to the outer surface of the main body 36. The fiber chip 38 retains an input optical fiber 37 for transmitting incident light into the package 31. A fiber array 40 is secured to the outer surface of the main body 36. The fiber array 40 retains output optical fibers 39. The separated light beams (wavelength λ1 to λn) are each converged by the collimator lens 33 and are each transmitted to one of the output optical fibers 39.

In the demultiplexer 30, the incident light (wavelength λ1 to λn) transmitted to the package 31 via the input optical fiber 37 is converted into parallel light by the collimator lens 33, which then enters the diffraction grating 34 to be separated into each wavelength. The separated beams are returned to unpolarized light by the polarized wave compensating filter 35 and are each converged by the collimator lens 33. The converged beams are each output from one of the output optical fibers 39 of the fiber array 40 to external optical devices.

Molded pieces 41, 42 made of material that includes anti-deterioration agent are located at a predetermined position out of the light path of the optical system 32 inside the package 31. The anti-deterioration agent may be either of desiccant (such as silica gel) and deoxidant (gas absorbing agent such as zeolite), or an agent in which desiccant and deoxidant are mixed at a predetermined ratio. Beside the silica gel, the desiccant may be calcium chloride, magnesium chloride, calcium oxide, or zeolite. As for the deoxidant, iron powder may be used instead of zeolite.

The molded piece 41 is formed by casting material that includes anti-deterioration agent into a sheet. The inner surface of the main body 36 includes a first inner surface 36a, which is located at a convergence point of the collimator lens 33, four second inner surfaces 36b, which are located between the first inner surface 36a and the collimator lens 33, and a third inner surface 36c, which opposes the first inner surface 36a. The molded piece 41 is attached to one of the four second inner surfaces 36b by an adhesive.

The molded piece 42 is formed by casting material that includes the anti-deterioration agent into a triangular prism. The molded piece 42 is located at a space having a triangular cross-section formed at the rear of the diffraction grating 34. The molded piece 42 is adhered to one of the second inner surfaces 36b and the third inner surface 36c of the main body 36 by an adhesive.

Figure 6:
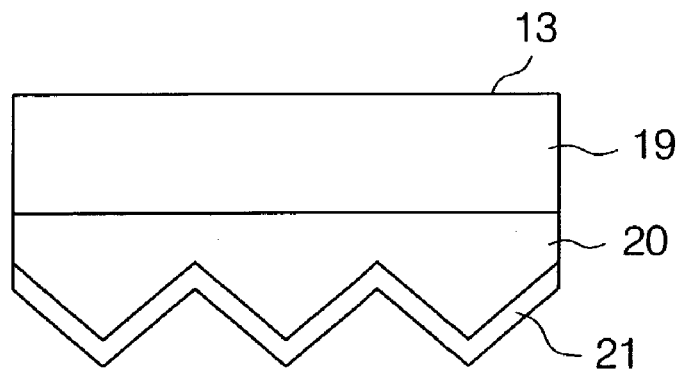
FIG. 6 is an enlarged cross-sectional view illustrating a structure of a diffraction grating of the demultiplexer shown in FIG. 5.

To increase the reflection coefficient, an aluminum layer that is the same as the aluminum layer 21 shown in FIG. 6 is formed on the surface of the diffraction grating 34. An antireflection dielectric multilayer film (not shown) that is the same as that of the conventional apparatus shown in FIG. 6 is formed on the first inner surface 36a of the main body 36. A magnesium fluoride film and a lanthanum titanate film (made of composite material of $TiO_2$ and $La_2O_3$) are overlapped on the surface of the collimator lens 33 in this order from the side close to the collimator lens 33 to prevent reflection.

The molded pieces 41, 42 include a predetermined amount of anti-deterioration agent required for preventing dew formation on and deterioration of the aluminum layer of the diffraction grating 34, the dielectric multilayer film of the first inner surface 36a, and the lanthanum titanate film and the magnesium fluoride film of the collimator lens 33 for a predetermined time period.

That is, the amount of inclusion G of the anti-deterioration agent (absorbing agent) such as desiccant and deoxidant is desirable to be determined in the following manner.

$$G \geq (Vi0 + y \times Vi\max)/(k \times vi)$$

ViO represents the amount of gas included during manufacturing of the demultiplexer 30 (i represents the type of gas, such as $H_2O$, $O_2$), Vimax represents the maximum amount of gas that penetrates into the demultiplexer 30 per year after completion of the demultiplexer 30. y represents a number of years passed after manufacturing of the demultiplexer 30, Vi represents the amount of gas absorption per unit weight of the gas absorbing agent, k represents the residual ratio of gas absorbing capacity at the manufacturing, and G represents the inclusion amount of the anti-deterioration agent (absorbing agent).

The first embodiment provides the following advantages.

(1) The molded pieces 41, 42 that include the anti-deterioration agent are located at a predetermined position out of the light path of the optical system 32 inside the package 31. The lid 36p is adhered to the main body 36 by an adhesive to close the opening 36o of the main body 36, thereby sealing the package 31.

Therefore, it is only required to arrange the molded pieces 41, 42 that include the required amount of anti-deterioration agent at the predetermined position inside the package 31 and attach the lid 36p to the main body 36 to seal the package 31.

That is, it is not required to trap nitrogen gas inside the package 31 or maintain the decompression state inside the package 31 to seal the package 31. Thus, it is not required to manufacture a completely sealed package using expensive material such as ceramics. Further, a special device for trapping nitrogen gas inside the package 31 is unnecessary, which eliminates a procedure for trapping the nitrogen gas. This improves working efficiency and facilitates manufacturing procedure, which reduces the manufacturing cost. Since it is not required to exchange air inside the package 31 with nitrogen gas after assembling the demultiplexer 30, the package 31 need not have a structure that enables gas exchange, which facilitates the manufacturing procedure. Further, a device for decompressing the package 31 is unnecessary, which eliminates the decompressing procedure. This further improves working efficiency and facilitates the manufacturing procedure, which reduces the manufacturing cost.

Therefore, it is not required to provide a special device or to perform a special procedure to prevent dew formation on and deterioration of the aluminum layer of the diffraction grating 34, the dielectric multilayer film of the first inner surface 36a, and the lanthanum titanate film and the magnesium fluoride film of the collimator lens 33. This facilitates the manufacturing procedure and reduces the manufacturing cost.

(2) It is not required to provide a special device to perform a special procedure to prevent dew formation on and deterioration by oxidization of the surface of each optical device of the demultiplexer 30, which is one type of optical modules. This facilitates the manufacturing procedure and reduces the manufacturing cost.

(3) The anti-deterioration agent is easily incorporated inside the package 31 by only placing the molded pieces 41, 42, which are formed by casting the material that includes anti-deterioration agent at the predetermined position inside the package 31.

(4) The molded piece 41, which is formed by casting material that includes the anti-deterioration agent into a sheet, is attached to at least one of the four second inner surfaces 36b of the main body 36. Therefore, the molded piece 41 is located at an excess space inside the package 31 out of the light path of the optical system 32. Accordingly, the design of the package 31 need not be modified to incorporate the anti-deterioration agent inside the package 31.

(5) The molded piece 42, which is formed by casting material that includes the anti-deterioration agent into a triangular prism, is located at the space having triangular cross-section at the rear of the diffraction grating 34. Therefore, the molded piece 42 is located at an excess space inside the package 31 out of the light path of the optical system 32. Accordingly, the design of the package 31 need not be modified to incorporate the anti-deterioration agent inside the package 31.

Figure 2:
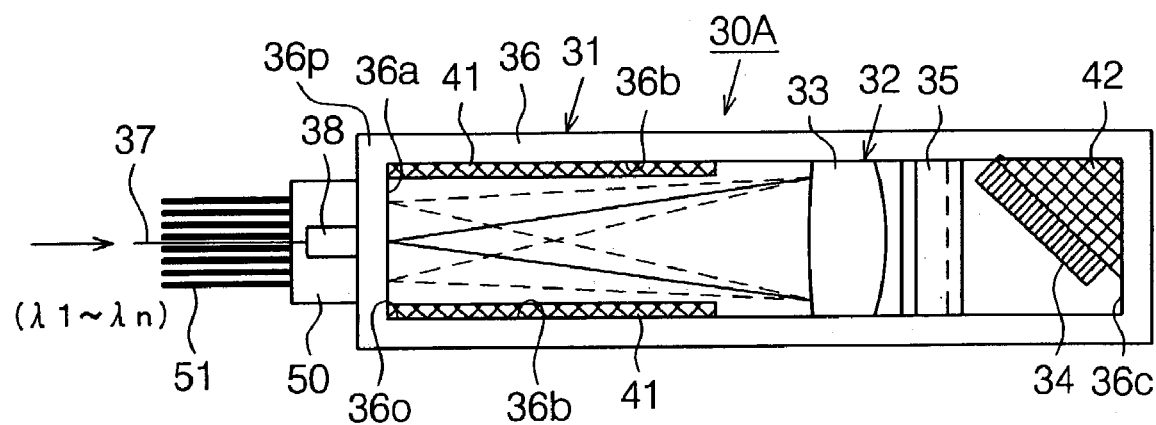
FIG. 2 is a partial cross-sectional view illustrating a schematic structure of a demultiplexer according to a second embodiment of the present invention.

A demultiplexer 30A according to a second embodiment will now be described with reference to FIG. 2. In the demultiplexer 30A, a photodetector array 50 is provided instead of the fiber array 40 of the first embodiment, and other structure is the same as the first embodiment.

The photodetector array 50 that has photodetectors is secured to the outer surface of the main body 36. The light beams (wavelength of $\lambda 1$ to $\lambda n$) that are separated by the diffraction grating 34 are each converged at the collimator lens 33 and are each linked with one of the photodetectors of the photodetector array 50. A reference numeral 51 in FIG. 2 represents output optical fibers.

The second embodiment provides the same advantages (1) to (5) as the first embodiment.

Figure 3:
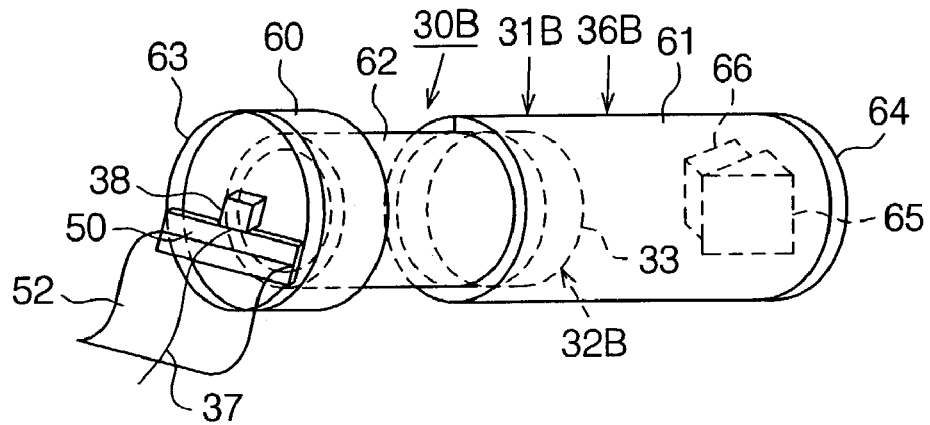
FIG. 3 is a perspective view illustrating a schematic structure of a demultiplexer according to a third embodiment of the present invention.

A demultiplexer 30B according to a third embodiment will now be described with reference to FIG. 3.

A package 31B of the demultiplexer 30B includes a main body 36B and first and second lids 63, 64. The main body 36B is constituted by two cylindrical bodies 60, 61, and a cylindrical adjustment tube 62. The adjustment tube 62 is fitted to the inner circumferential surfaces of the cylindrical bodies 60, 61 to couple the cylindrical bodies 60, 61. The first lid 63 is attached to the cylindrical body 60 by an adhesive to cover one of the openings (left side opening) of the cylindrical body 60. The second lid 64 is attached to the cylindrical body 61 by an adhesive to cover the other opening (right side opening) of the cylindrical body 61. Accordingly, the package 31B is sealed. The cylindrical body 60 is formed to have enough length to fit with the adjustment tube 62. In contrast, the cylindrical body 61 is formed to have the length required for arranging an optical system 32B inside the cylindrical body 61. The cylindrical bodies 60, 61, the adjustment tube 62, and the first and second lids 63, 64 are all made of glass material.

The optical system 32B arranged inside the cylindrical body 61 of the package 31B includes the collimator lens 33 and a demultiplexing unit, which is a diffraction grating 66. The collimator lens 33 converts incident light (wavelength $\lambda 1$ to $\lambda n$) transmitted into the package 31B into parallel light. The diffraction grating 66 separates the incident light that is converted to the parallel light into each wavelength. The diffraction grating 66 is secured to the inner surface of the second lid 64 at a predetermined angle.

The fiber chip 38 and the photodetector array 50 are secured to the outer surface of the first lid 63. The fiber chip 38 retains the input optical fiber 37, which transmits incident light into the package 31B. The separated light beams are converged by the collimator lens 33 and linked to one of the photodetectors of the photodetector array 50. An output electric cable 52 is attached to the photodetector array 50. The output electric cable 52 includes output electrical terminals formed on a flexible printed substrate.

A molded piece 65, which is formed by casting material that includes an anti-deterioration agent, is located at a predetermined position that is out of the light path of the optical system 32B inside the package 31B. The molded piece 65 serves as a fixing member for retaining the diffraction grating 66 at a predetermined angle. The molded piece 65 is attached to the inner surface of the second lid 64 with an adhesive.

The third embodiment provides the following advantages.

(6) The molded piece 65 that includes the anti-deterioration agent is located at a position out of the light path of the optical system 32B inside the package 31B. The first and second lids 63, 64 are attached to the cylindrical bodies 60, 61 to close the openings of the cylindrical bodies 60, 61, thereby sealing the package. Therefore, the package 31B is hermetically sealed by only placing the molded piece 65 that includes the anti-deterioration agent at the predetermined position inside the package 31B and attaching the first and second lids 63, 64 to the cylindrical bodies 60, 61.

Therefore, it is not required to provide a special device or perform a special procedure to prevent dew formation on and deterioration by oxidization of the surface of each optical device of the collimator lens 33. This simplifies the manufacturing procedure and reduces the manufacturing cost.

(7) The molded piece 65, which is formed by casting material that includes anti-deterioration agent, serves as a positioning member for retaining the diffraction grating 66 at the predetermined angle. The molded piece 65 is attached to the inner surface of the second lid 64 by an adhesive. The molded piece 65 is located at an excess space inside the package 31B out of the light path of the optical system 32B. Accordingly, the design of the package 31B need not be modified to assemble the anti-deterioration agent inside the package 31B.

(8) The molded piece 65 serves as a positioning member for retaining the diffraction grating 66 at the predetermined angle. Therefore, the molded piece 65 functions to retain the diffraction grating 66 at the predetermined angle in addition to preventing the deterioration of each optical device of the optical system 32B.

It should be apparent to those skilled in the art that the present invention may be embodied in many other specific forms without departing from the spirit or scope of the invention. Particularly, it should be understood that the invention may be embodied in the following forms.

In the first and second embodiments, the optical module of the present invention is applied to the demultiplexers 30, 30A. The demultiplexers 30, 30A may also be used as multiplexers. For example, as shown in FIG. 1, in the demultiplexer 30 according to the first embodiment, optical signals having different wavelengths may be input from the output optical fibers 39 and combined light may be output from the input optical fiber 37. In this case, a multiplexing unit for multiplexing the optical signals (incident light) having different wavelengths inside the package 31 corresponds to the diffraction grating 34.

In the first embodiment, an accommodating portion for storing powder anti-deterioration agent may be arranged on the inner surface of the main body 36 or the lid 36p instead of molded pieces. In this case, a vent is formed in the accommodating portion such that gas and vapor is exchanged between the anti-deterioration agent and the inside of the package 31. Such modification example is shown in FIGS. 4(a) and 4(b).

Figure 4:
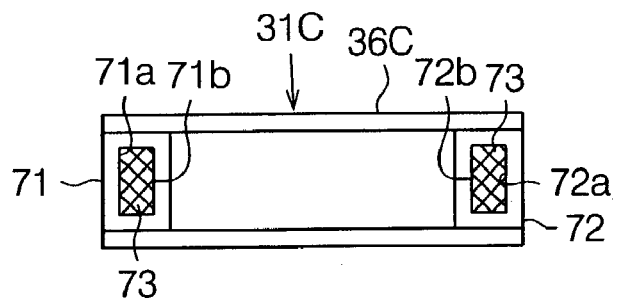
FIGS. 4(a) and 4(b) are cross-sectional views illustrating schematic structures of modified examples of a package.
Figure 4:
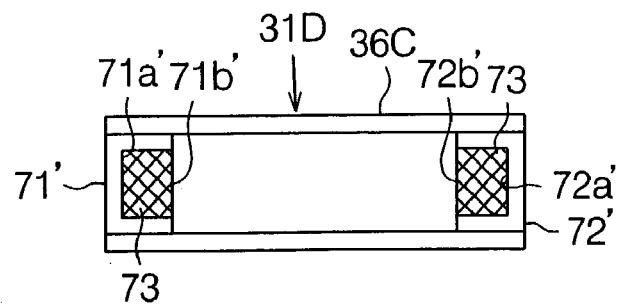
Figure 5:
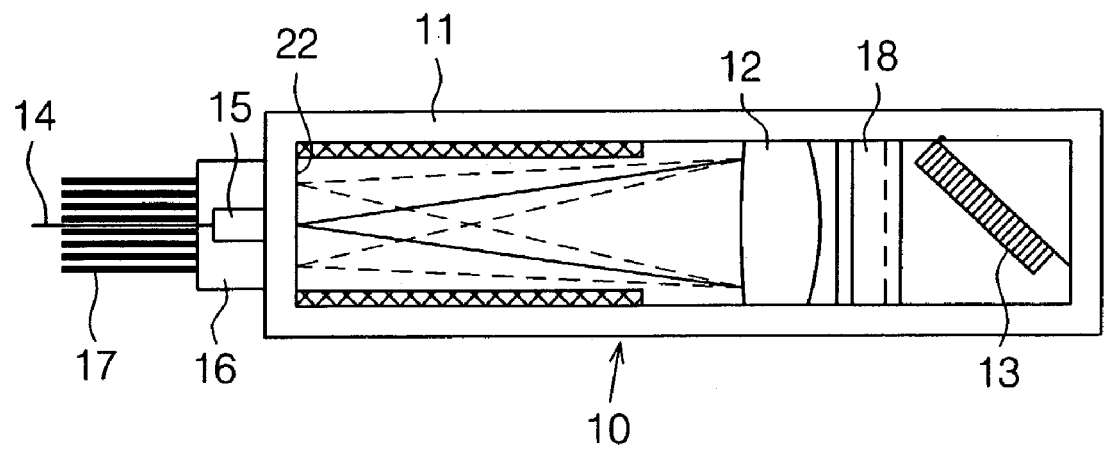
FIG. 5 is a partial cross-sectional view illustrating a schematic structure of a demultiplexer according to a prior art.

According to the modification example shown in FIG. 4(a), a package 31C includes a cylindrical main body 36C, which is made of material such as glass, and rectangular support frame glasses (or lids) 71, 72, attached to the inner surface of both ends of the main body 36C. The support frame glasses 71, 72 are attached to the inner surface of both ends of the main body 36C by an adhesive to seal the package 31C. Hollow accommodating portions 71a, 72a for storing an anti-deterioration agent 73 and the vents 71b, 72b are formed in the support frame glasses 71, 72, respectively, in a range the required strength is maintained.

With this structure, moisture and oxygen inside the package 31C is removed through the vents 71b, 72b using the anti-deterioration agent 73. It is only required to attach the support frame glasses 71, 72, which has the hollow accommodating portions 71a, 72a in which the anti-deterioration agent 73 is stored, to the inner surface of the main body 36C by an adhesive. This further facilitates the manufacturing procedure.

In the modified embodiment shown in FIG. 4(b), the package 31D includes a cylindrical main body 36C, U-shaped support frame glass (or lids) 71', 72'. The support frame glasses 71', 72' are attached to the inner surface of both ends of the main body 36C by an adhesive to seal the package 31D. Hollow accommodating portions 71a', 72a' and mesh holes 71b', 72b' for ventilation are arranged in the support frame glasses 71', 72', respectively. The sizes of the mesh holes 71b', 72b' are set such that the anti-deterioration agent 73 does not leak inside the package 31D.

With this structure, moisture and oxygen inside the package 31D are removed through the mesh holes 71b', 72b' by the anti-deterioration agent 73. It is only required to attach the support frame glasses 71', 72', which has the hollow accommodating portions 71a', 72a' in which the anti-deterioration agent 73 is stored, to the inner surfaces of both ends of the main body 36C by an adhesive. This further facilitates the manufacturing procedure.

In the above embodiments, the optical module of the present invention is applied to the demultiplexer used for an optical communication monitoring apparatus. However, the present invention may be applied to optical modules in which optical system is accommodated inside the package.

In the first and second embodiments, at least one of the main body 36 and the lid may be formed by casting glass material that includes anti-deterioration agent. This increases the amount of inclusion G of the anti-deterioration agent (absorbing agent) such as desiccant and deoxidant.

In the second embodiment, light that is separated by the diffraction grating 34 is converged by the collimator lens 33 and received by the photodetector array 50, which is located outside the package 31. However, the present invention may be applied to a structure in which the photodetector array 50 is located inside the package 31. In the same manner, in the third embodiment, the present invention may be applied to a structure in which the photodetector array 50 is located inside the package 31B.

In the third embodiment, at least one of the cylindrical bodies 60, 61, the adjustment tube 62, and the lids 63, 64 may be formed by casting glass material that includes anti-deterioration agent. This increases the amount of inclusion G of the anti-deterioration agent (absorbing agent) such as desiccant and deoxidant.

In the above embodiments and the modified embodiments shown in FIGS. 4(a), 4(b), anti-deterioration agent may be included in the adhesive that attaches the components of the package 31, 31B, 31C, 31D. This increases the amount of inclusion C of the anti-deterioration agent (absorbing agent) such as desiccant and deoxidant.

In the third embodiment, the present invention may be applied to a fiber array that retains several optical fibers instead of the photodetector array 50.

Therefore, the present examples and embodiments are to be considered as illustrative and not restrictive and the invention is not to be limited to the details given herein, but may be modified within the scope and equivalence of the appended claims.

The invention claimed is:

1. An optical module, wherein the optical module includes a package that accommodates an optical system having a light path, the optical module comprising;
   a main body, which is part of the package, wherein the main body has an opening;
   a lid, which is attached to the main body to close the opening of the main body, wherein the lid seals the package; and
   an anti-deterioration agent located inside the package at a position out of said light path of the optical system, wherein said anti-deterioration agent is for preventing deterioration of the optical system, wherein the anti-deterioration agent includes at least one of desiccant and deoxidant,
   wherein the optical system includes a demultiplexing unit for separating incident light that includes optical signals having different wavelengths into each wavelength;
   wherein the optical system includes a collimator lens for converting incident light that includes optical signals into parallel light,
   wherein the demultiplexing unit includes a diffraction grating for separating the parallel light into optical signals having different wavelengths, and wherein the separated optical signals are each converged by the collimator lens;
   wherein the diffraction grating is inclined with respect to an optical axis of the collimator lens;
   wherein the anti-deterioration agent is a molded piece formed into a predetermined shape, and wherein the anti-deterioration agent is located at a space formed between the diffraction grating and the package at the rear of the diffraction grating.

2. The optical module according to claim 1, wherein the optical system includes a multiplexing unit for combining incident light that includes optical signals having different wavelengths.

3. An optical module, wherein the optical module includes a package that accommodates an optical system having a light path, the optical module comprising;
   a main body, which is part of the package, wherein the main body has an opening;
   a lid, which is attached to the main body to close the opening of the main body, wherein the lid seals the package;
   an anti-deterioration agent located inside the package at a position out of said light path of the optical system, wherein said anti-deterioration agent is for preventing deterioration of the optical system, wherein the anti-deterioration agent includes at least one of desiccant and deoxidant;
   wherein the main body is hollow cylindrical, having openings at both ends of the main body,
   wherein the package includes two lids, and
   wherein each lid closes one of the openings of the hollow cylindrical main body, wherein the two lids include a first lid, and a demultiplexing unit is secured to the first lid, wherein the demultiplexing unit includes a diffraction grating, and
   a fixing member for securing the diffraction grating to the first lid in a state in which the diffraction grating is inclined with respect to the light path of the optical system, wherein the fixing member includes the anti-deterioration agent.

4. An optical module, wherein the optical module includes a package, which accommodates an optical system, the optical module comprising;
   a main body, which is part of the package, wherein the main body has an opening;
   a lid, which is attached to the main body to close the opening of the main body, wherein the lid seals the package; and
   an anti-deterioration agent located inside the package at a position out of a light path of the optical system for preventing deterioration of the optical system, wherein the anti-deterioration agent includes a first molded piece, which is formed into a sheet, and a second molded piece, which is formed into a block,
   wherein the optical system includes a collimator lens and a diffraction grating, wherein the collimator lens converts incident light, which consists of optical signals, into parallel light, and where the diffraction grating separates the parallel light into optical signals having different wavelengths, and
   wherein the first molded piece is located along the inner surface of the main body, and the second molded piece is located at the rear of the diffraction grating.

5. The optical module, according to claim 4, wherein the anti-deterioration agent includes at least one if the desiccant and deoxidant.

6. The optical module according to claim 4, wherein the diffraction grating is inclined with respect to a light axis of the collimator lens.

* * * * *